(12) United States Patent
Lin

(10) Patent No.: US 11,194,502 B1
(45) Date of Patent: Dec. 7, 2021

(54) ELECTRONIC DEVICE, FLASH MEMORY CONTROLLER AND METHOD FOR PERFORMING GARBAGE COLLECTION OPERATION ON FLASH MEMORY MODULE

(71) Applicant: Silicon Motion, Inc., Hsinchu County (TW)

(72) Inventor: Wen-Sheng Lin, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/082,039

(22) Filed: Oct. 28, 2020

(30) Foreign Application Priority Data

Jul. 1, 2020 (TW) .................................. 109122199

(51) Int. Cl.
*G06F 3/06* (2006.01)

(52) U.S. Cl.
CPC .......... *G06F 3/0652* (2013.01); *G06F 3/0608* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| 2017/0300410 A1 | 10/2017 | Zhang |
| 2019/0227927 A1 | 7/2019 | Miao |

FOREIGN PATENT DOCUMENTS

| CN | 106557434 A | 4/2017 |
| CN | 111159059 A | 5/2020 |
| TW | 201835757 A | 10/2018 |
| TW | 202011199 A | 3/2020 |

*Primary Examiner* — Christopher D Birkhimer
(74) *Attorney, Agent, or Firm* — Winston Hsu

(57) ABSTRACT

A flash memory controller is configured to access a flash memory module, and the flash memory controller includes a read-only memory and a microprocessor. When the flash memory controller is powered on and performs an initialization operation, within a predetermined time range of the initialization operation, the microprocessor determines whether a number of spare blocks in the flash memory module is lower than a first threshold value to determine whether to perform a garbage collection operation. When an elapsed time since the flash memory controller is powered on exceeds the predetermined time range, the microprocessor determines whether a number of spare blocks in the flash memory module is lower than a second threshold to determine whether to perform another garbage collection operation, where the second threshold value is lower than the first threshold.

20 Claims, 5 Drawing Sheets

ELECTRONIC DEVICE, FLASH MEMORY CONTROLLER AND METHOD FOR PERFORMING GARBAGE COLLECTION OPERATION ON FLASH MEMORY MODULE

BACKGROUND OF THE INVENTION

1. Field of the Invention

The present invention relates to a flash memory, and more particularly, to a garbage collection operation on a flash memory.

2. Description of the Prior Art

In the operation of a flash memory module, since stored data cannot be updated by overwriting, updated data for replacing old data will be directly written into the flash memory even the old data still exist in the flash memory module. As a result, the flash memory module includes a lot of old data (invalid data) and updated data (valid data), which wastes storage space. Therefore, in order to prevent these invalid data from occupying storage space of the flash memory module, a flash memory controller determines whether to perform a garbage collection operation according to a number of spare blocks in the flash memory module. For example, when the number of spare blocks in the flash memory module is lower than a threshold value, the flash memory controller will control the flash memory module to move valid data in multiple source blocks (data blocks) to a spare block, and then all data in the multiple source blocks are erased as a new spare block to release the storage space of the flash memory module. However, considering utilization of the flash memory module, since the garbage collection operation affects usual access of the flash memory module, the above threshold value is generally not set too high. For example, the threshold value may be one-tenth of a number of all blocks in the flash memory module.

As mentioned above, since the aforementioned threshold value will not be set too high, the flash memory controller starts to perform the garbage collection operation when there are only a few spare blocks in the flash memory module. However, consider a case where an abnormal power failure occurs during a process of garbage collection operation that moves valid data in multiple source blocks to a spare block. When the flash memory is powered on again after the abnormal power failure, the above spare block will be directly discarded (that is to say, the above spare block is blocked from being used and is marked as invalid), and the garbage collection operation will be restarted to move the valid data in the multiple source blocks to another spare block, thereby ensuring the data correctness. As mentioned above, when an abnormal power failure occurs during the process of garbage collection operation of the flash memory module, a spare block will be wasted. Therefore, if the flash memory module is powered off frequently under a condition that the number of spare blocks is insufficient and fails to complete the garbage collection operation, the spare blocks in the flash memory module may be reduced rapidly, which may make the flash memory module does not allow write operation but only read operation.

In addition, in some schemes, each block in the flash memory module has many pages, that is to say, each block has a larger size of storage space (e.g., 16 megabytes (MB)). However, the flash memory module may have a very few of blocks. In this case, since it takes a longer time to complete the garbage collection operation fora larger block, a probability of encountering the abnormal power failure is higher. In addition, a small number of blocks mean that the flash memory module performs the garbage collection operation only when the number of spare blocks is very small, such that the problem of rapid reduction of spare blocks caused by frequent power failures of the flash memory module with an insufficient number of spare blocks has become more serious.

SUMMARY OF THE INVENTION

One of the objectives of the present invention is to provide a method for controlling the flash memory module. In this method, the relevant parameters of the garbage collection operation can be specially set, to solve the aforementioned problem.

At least one embodiment of the present invention provides a flash memory controller. The flash memory controller is configured to access a flash memory module. The flash memory controller includes a read-only memory and a microprocessor. Wherein, when the flash memory controller is powered on and performs an initialization operation, within a predetermined time range of the initialization operation, the microprocessor determines whether a number of spare blocks in the flash memory module is lower than a first threshold value to determine whether to perform a garbage collection operation; and when an elapsed time since the flash memory controller is powered on exceeds the predetermined time range, the microprocessor determines whether the number of spare blocks in the flash memory module is lower than a second threshold value to determine whether to perform another garbage collection operation. Wherein, the second threshold is lower than the first threshold.

At least one embodiment of the present invention provides an electronic device including a flash memory module and a flash memory controller. Wherein, when the flash memory controller is powered on and performs an initialization operation, within a predetermined time range of the initialization operation, the flash memory controller determines whether a number of spare blocks in the flash memory module is lower than a first threshold value to determine whether to perform a garbage collection operation; and when an elapsed time since the flash memory controller is powered on exceeds the predetermined time range, the flash memory controller determines whether the number of spare blocks in the flash memory module is lower than a second threshold value to determine whether to perform another garbage collection operation. Wherein, the second threshold is lower than the first threshold.

At least one embodiment of the present invention provides a method for performing a garbage collection operation to a flash memory module. The method may comprise: when a flash memory controller configured to access the flash memory module is powered on and performs an initialization operation, within a predetermined time range of the initialization operation, determining whether a number of spare blocks in the flash memory module is lower than a first threshold value to determine whether to perform a garbage collection operation; and when an elapsed time since the flash memory controller is powered on exceeds the predetermined time range, determining whether the number of spare blocks in the flash memory module is lower than a second threshold value to determine whether to perform another garbage collection operation, where the second threshold is lower than the first threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
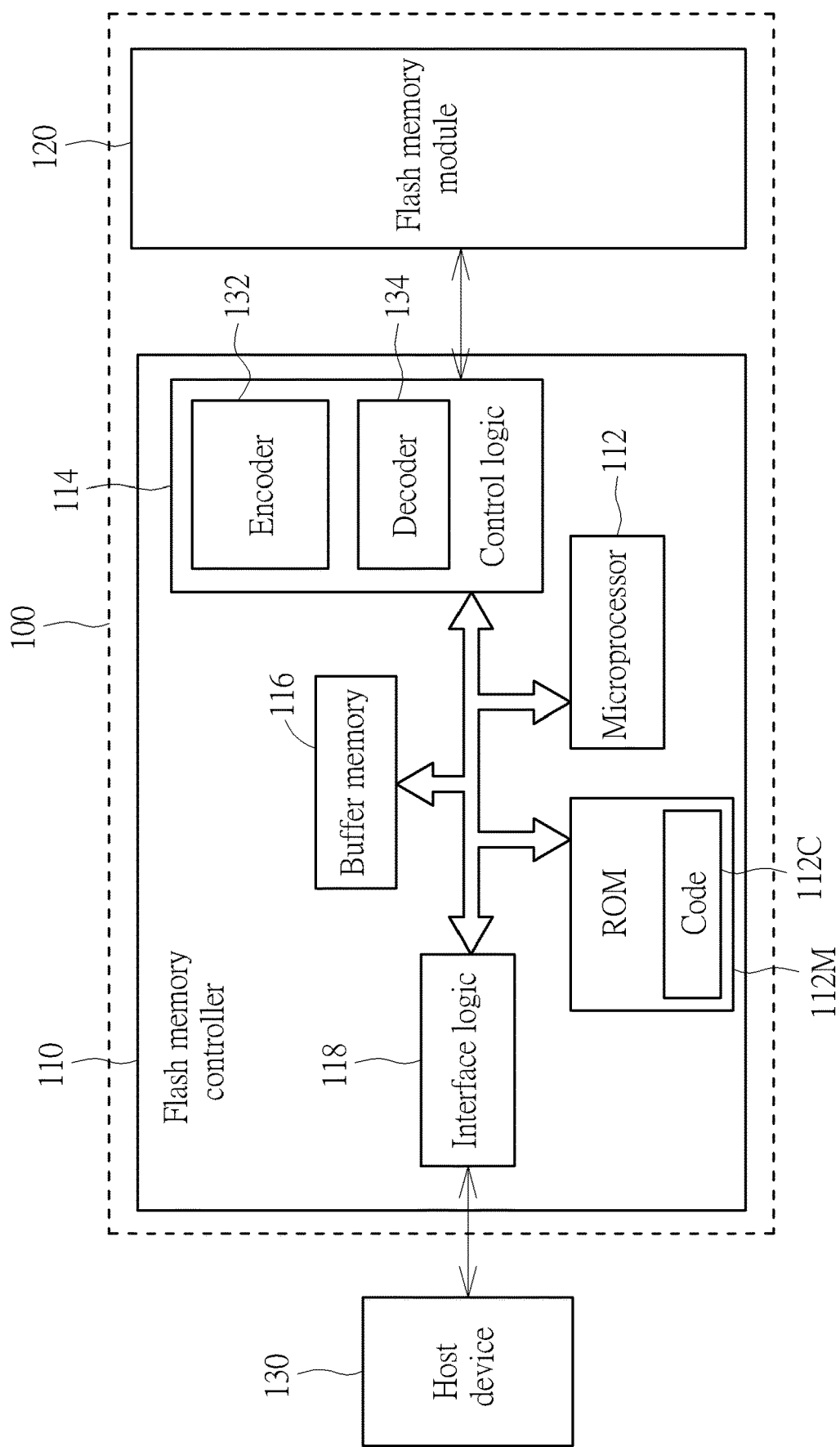
FIG. 1 is a diagram illustrating an electronic device according to an embodiment of the present invention.

FIG. 1 is a diagram illustrating an electronic device 100 according to an embodiment of the present invention. The electronic device 100 includes a flash memory module 120 and a flash memory controller 110. The flash memory controller 110 is configured to access the flash memory module 120. According to the present embodiment, the flash memory controller 110 includes a microprocessor 112, a read only memory (ROM) 112M, a control logic 114, a buffer memory 116 and an interface logic 118. The read only memory 112M is configured to store a code 112C, and the microprocessor 112 is configured to execute the code 112C to control access of the flash memory module 120. The control logic 114 includes an encoder 132 and a decoder 134, wherein the encoder 132 is configured to encode data which is written in the flash memory module 120 to generate a corresponding check code (also known as an error correction code (ECC)), and the decoder 134 is configured to decode data read from the flash memory module 120.

In a general situation, the flash memory module 120 includes a plurality of flash memory chips, and each flash memory chip includes a plurality of blocks. The flash memory controller 110 performs a block-based erase operation upon the flash memory module 120. In addition, a block can record a specific number of pages, wherein the flash memory controller 110 performs a page-based write operation upon the flash memory module 120. In the present embodiment, the flash memory module 120 is a 3D NAND-type flash memory module.

Specifically, through the microprocessor 112 executing the code 112C, the flash memory controller 110 may use its own internal components to perform many control operations. For example, the flash memory controller 110 uses the control logic 114 to control access of the flash memory module 120 (especially access of at least one block or at least one page), uses the buffer memory 116 to perform a required buffering operation, and uses the interface logic 118 to communicate with a host device 130. The buffer memory 116 is implemented by a random access memory (RAM). For example, the buffer memory 116 may be a static RAM (SRAM), but the present invention is not limited thereto.

In one embodiment, the electronic device 100 may be a portable memory device such as a memory card which conforms to one of the SD/MMC, CF, MS and XD specifications, and the host device 130 is another electronic device able to be connected to the electronic device 100, such as a cellphone, a laptop, a desktop computer, etc. In another embodiment, the electronic device 100 may be a solid state drive (SSD) or an embedded memory device which conforms to the universal flash storage (UFS) specification or embedded Multi Media Card (EMMC) specification, and can be arranged in a cellphone, a laptop or a desktop computer. At this time, the host device 130 can be a processor of the cellphone, a processor of the laptop or a processor of the desktop computer.

Figure 2:
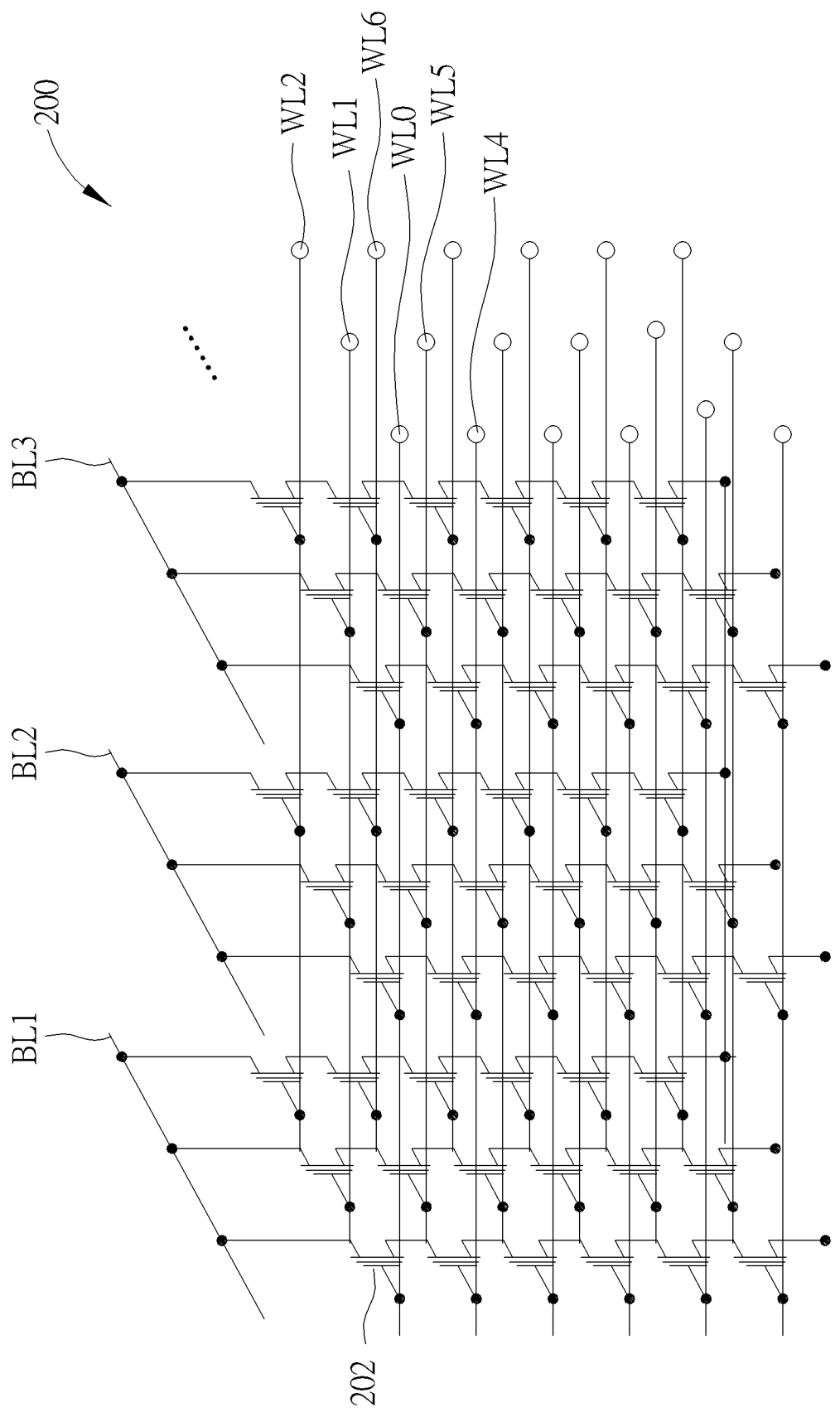
FIG. 2 is a diagram illustrating a block of a flash memory module according to an embodiment of the present invention.

FIG. 2 is a diagram illustrating a block 200 of the flash memory module 120 according to an embodiment of the present invention, wherein the flash memory module 120 is a 3D NAND-type flash memory module. As shown in FIG. 2, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2) and a plurality of word lines (e.g., WL0-WL2 and WL4-WL6 shown in FIG. 2). Taking a top plane in FIG. 2 as an example, all floating gate transistors on the word line WL0 form at least one page, all floating gate transistors on the word line WL1 form at least another one page, and so on. In addition, the definition between the word line WL0 and the page (logic page) may vary depending on a writing method of the flash memory. In detail, when data are stored using a Single-Level cell (SLC) means, all floating gate transistors on the word line WL0 correspond to only one logic page; when data are stored using a Multi-Level cell (MLC) means, all floating gate transistors on the word line WL0 correspond to two logic pages; when data are stored using a Triple-Level cell (TLC) means, all floating gate transistors on the word line WL0 correspond to three logic pages; and when data are stored using a Quad-Level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 3:
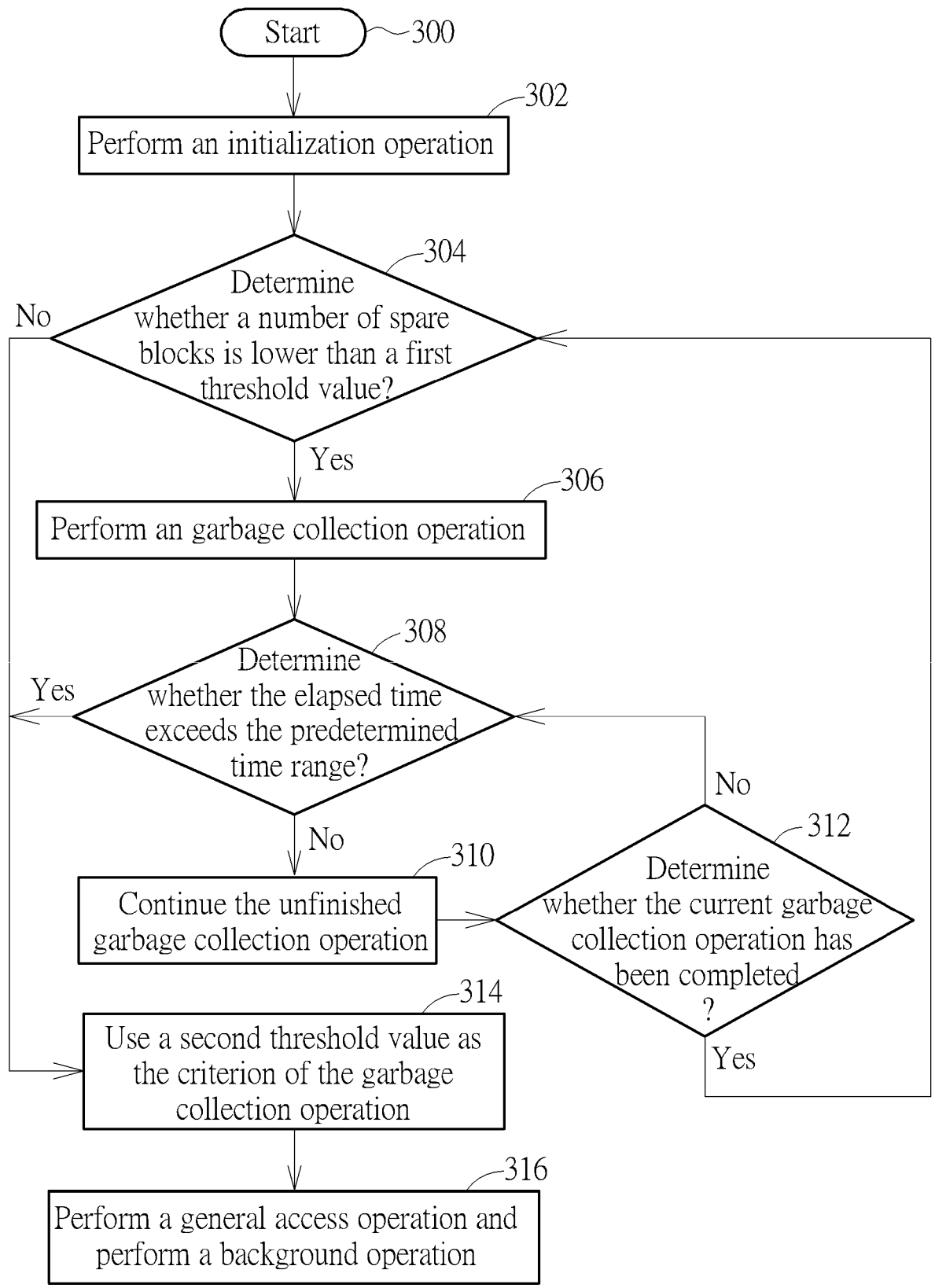
FIG. 3 is a flowchart illustrating a flash memory controller controlling the flash memory module to perform a garbage collection operation according to a first embodiment of the present invention.

FIG. 3 is a flowchart illustrating the flash memory controller 110 controlling the flash memory module to perform a garbage collection operation according to a first embodiment of the present invention. In Step 300, the flow starts, and the flash memory controller 110 and the flash memory module 120 are powered on (that is, from a power-off state or a shutdown state to an active state). In Step 302, the flash memory controller 110 and the flash memory module 120 perform an initialization operation. That is, the flash memory controller 110 starts to establish a look-up table required for system operation. For example, a look-up table may be established according to relevant data read from the flash memory module 120, and may be temporarily stored in the buffer memory 116. It should be noticed that, in order to prevent user's experience from being affected by the long initialization time, the flash memory controller 110 has a limitation of a predetermined time range for performing the initialization operation. That is, the whole initialization operation has to be finished in the predetermined time range, and the predetermined time range is usually very small, such as about 1 second or 2 seconds. In addition, since the initialization operation of the flash memory controller 110 can be finished in 1 second in general, the present embodiment provides a special garbage collection operation, such that the flash memory controller 110 performs the special garbage collection operation upon the flash memory module 120 after the initialization operation is finished and an elapsed time since the flash memory controller 110 is powered on does not exceed the predetermined time range, to solve the aforementioned problem of insufficient spare blocks.

Figure 4:
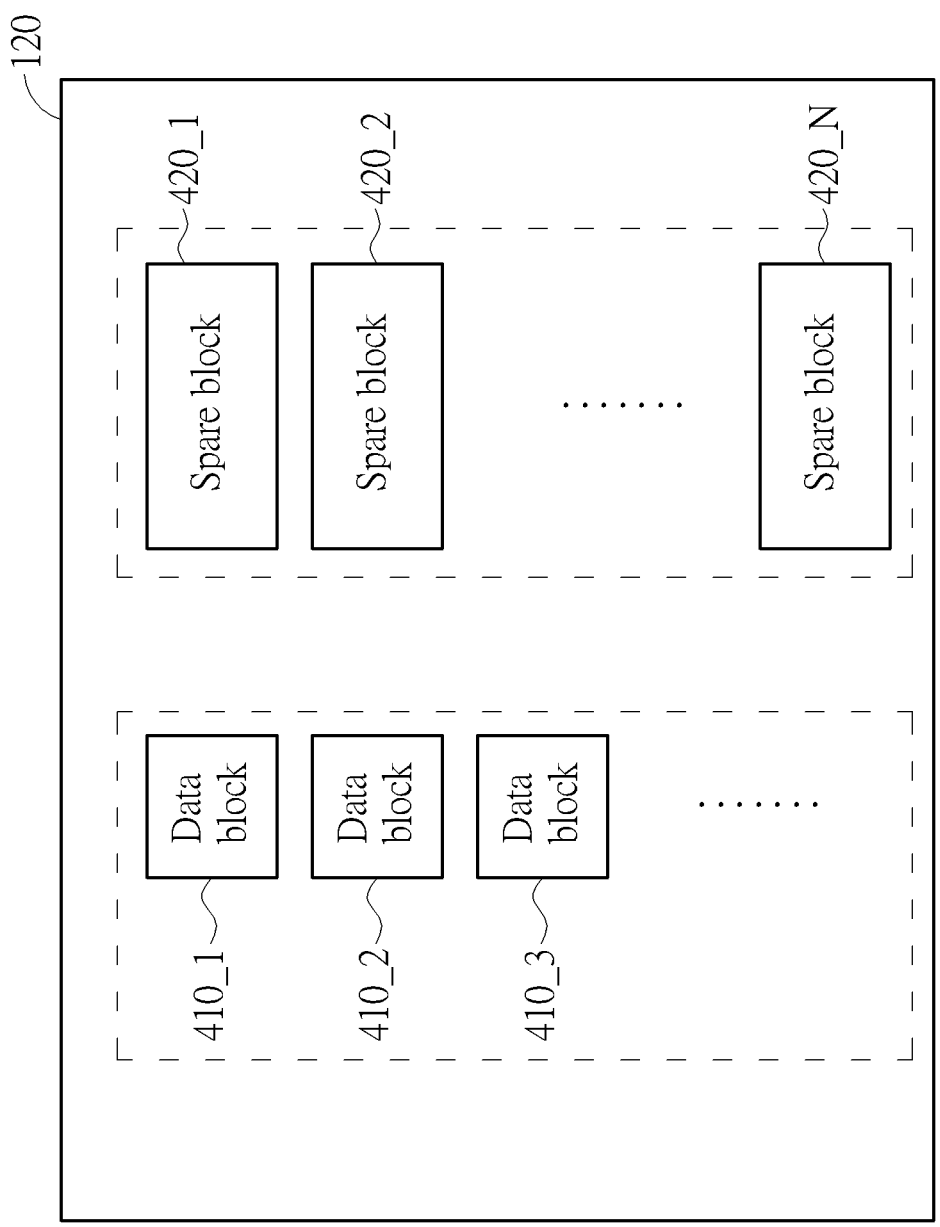
FIG. 4 is a diagram illustrating the garbage collection operation.

In Step 304, the microprocessor 112 of the flash memory controller 110 determines whether a number of spare blocks in the flash memory module 120 is lower than a first threshold value to determine whether to perform a garbage collection operation. If Yes, the flow proceeds with Step 306; if No, the flow proceeds with Step 314. Specifically, the microprocessor 112 can determine the current number of spare blocks in the flash memory module 120 through some look-up tables stored in the buffer memory 116, where the spare blocks can also be called as blank blocks, that is, blocks with no data being stored therein. In the present embodiment, the first threshold value may be a higher value, such as 20% or 30% of the total number of blocks of the flash memory module 120. For example, referring to FIG. 4, the flash memory module 120 includes a plurality of data blocks 410_1, 410_2 and 410_3 which have data stored therein and a plurality of spare blocks 420_1-420_N. Assuming that the flash memory module 120 has a storage space of 8 gigabytes (GB), and each block is 16 megabytes (MB), when the number of spare blocks 420_1-420_N is lower than 100 or 150, the flow proceeds with Step 306. It should be noticed that the above first threshold value is for illustrative purposes only, and the present invention is not limited thereto.

In Step 306, the microprocessor 112 controls the flash memory module 120 to start to perform the garbage collection operation. In detail, the microprocessor 112 may refer to some internal criterions to choose block (s) to which the garbage collection operation can be applied. For example, the microprocessor 112 may choose a block having most invalid pages, a block having the worst quality of data, a block with the most read times, a block with the most erase times, and/or choose a block meeting other criterion. The microprocessor 112 may move the valid data in the chosen block (s) to a spare block in sequence. Taking FIG. 4 as an example, the microprocessor 112 may move the content of the valid pages in the data block 410_1 to the spare block 420_1 in sequence. After all the valid pages in the data block 410_1 are moved, the valid pages in the data block 410_2 are moved to the spare block 420_1 in sequence. After all the valid pages in the data block 410_2 are moved, the valid pages in the data block 410_3 are moved to the spare block 420_1 in sequence, and so on.

During a period in which the garbage collection operation is running, in Step 308, the microprocessor 112 continually determines whether the elapsed time since the flash memory controller 110 is powered on exceeds the predetermined time range such as 1 second or 2 seconds. If the elapsed time exceeds the predetermined time range, the flow proceeds with Step 314; if the elapsed time does not exceed the predetermined time range, the flow proceeds with Step 310 to continue the unfinished garbage collection operation.

In Step 312, the microprocessor 112 determines whether the current garbage collection operation has been completed. If Yes, the flow proceeds with Step 304; if No, the flow proceeds with Step 308 again. In detail, the microprocessor 112 may determine whether the current garbage collection operation has been completed according to whether all pages of the spare block 420_1 are full. That is to say, when writing the last page of the spare block 420_1 is finished, this garbage collection operation is finished, and the microprocessor 112 starts to update a mapping table that records mapping between related logical addresses and physical addresses, and erases data in the data blocks 410_1, 410_2 and 410_3 to set these blocks as spare blocks. In one example, if all the pages of the spare block 420_1 are full when the valid data of the data block 410_3 have not been completely moved, then the garbage collection operation is finished at this time, but all of the contents of the data block 410_3 are retained and wait for the next garbage collection operation for further processing.

In the above operations in Steps 304 to 312, it is mainly described that, within the predetermined time range of the initialization operation, the flash memory controller 110 uses the remaining time after completeness of the initialization operation to perform the garbage collection operation. At this time, the first threshold value of the garbage collection operation is higher, that is, the garbage collection operation is performed when the number of the spare blocks is still sufficient. In addition, in Step 304, when the microprocessor 112 determines the current number of the spare block of the flash memory module 120 is higher than the first threshold value, the current number of spare blocks is sufficient. Therefore, the microprocessor 112 does not actively perform any garbage collection operation within the predetermined time range of the initialization operation, and the flow directly proceeds with Step 314; in addition, in Step 308, when the elapsed time since the flash memory controller 110 is powered on exceeds the predetermined time range, the microprocessor 112 temporarily stops the garbage collection operation and the flow enters Step 314. For example, the microprocessor 112 temporarily stops moving the valid data of the data blocks 410_1-410_3 to the spare block 420_1, and keeps the content of the data blocks 410_1-410_3.

In Step 314, the microprocessor 112 is configured to determine whether to change the criterion for the garbage collection operation from the first threshold value to the second threshold value, wherein the second threshold value may be any value lower than the first threshold value. For example, the second threshold value may be 10% of the total number of blocks in the flash memory module 120.

In Step 316, the flash memory controller 110 and the flash memory module 120 perform a general access operation, such as reading, writing and data management. In addition, the microprocessor 112 performs a background operation, wherein the background operation is configured to start to perform the garbage collection operation when the flash memory controller is in an idle state. For example, if another write/read command is not received within a period of time (e.g. 10 milliseconds or 100 milliseconds) after one write/read command is received from the host device 130, the unfinished garbage collection operation may be resumed, or a new garbage collection operation may be started. For example, assuming that the garbage collection operation started in Step 306 is temporarily stopped because it exceeds the predetermined time range in Step 308, the microprocessor 112 can take advantage of the flash memory controller 110 in the idle state to sequentially move the valid data from the data blocks 410_1-410_3 to the spare block 420_1, and does not end the garbage collection operation until all the pages of the spare block 420_1 are full. After the spare block 420_1 completes the garbage collection operation and is used as a data block, the microprocessor 112 does not perform the garbage collection operation unless the number of spare blocks in the flash memory module 120 is lower than the second threshold, to prevent the normal access of the flash memory controller 110 from being affected by the frequent garbage collection operations.

As described in the embodiment in FIG. 3 above, because of using the higher first threshold value in the predetermined time range of the initialization operation as the criterion to determine whether to perform the garbage collection operation, the remaining time of the predetermined time range can be fully utilized to generate additional spare blocks as possible, to avoid the problem of insufficient spare blocks. In addition, a general operation that is performed after the initialization operation is finished may use the lower second threshold value as the criterion of the garbage collection operation, it may prevent the normal access of the flash memory controller 110 from being affected by the frequent garbage collection operations.

Figure 5:
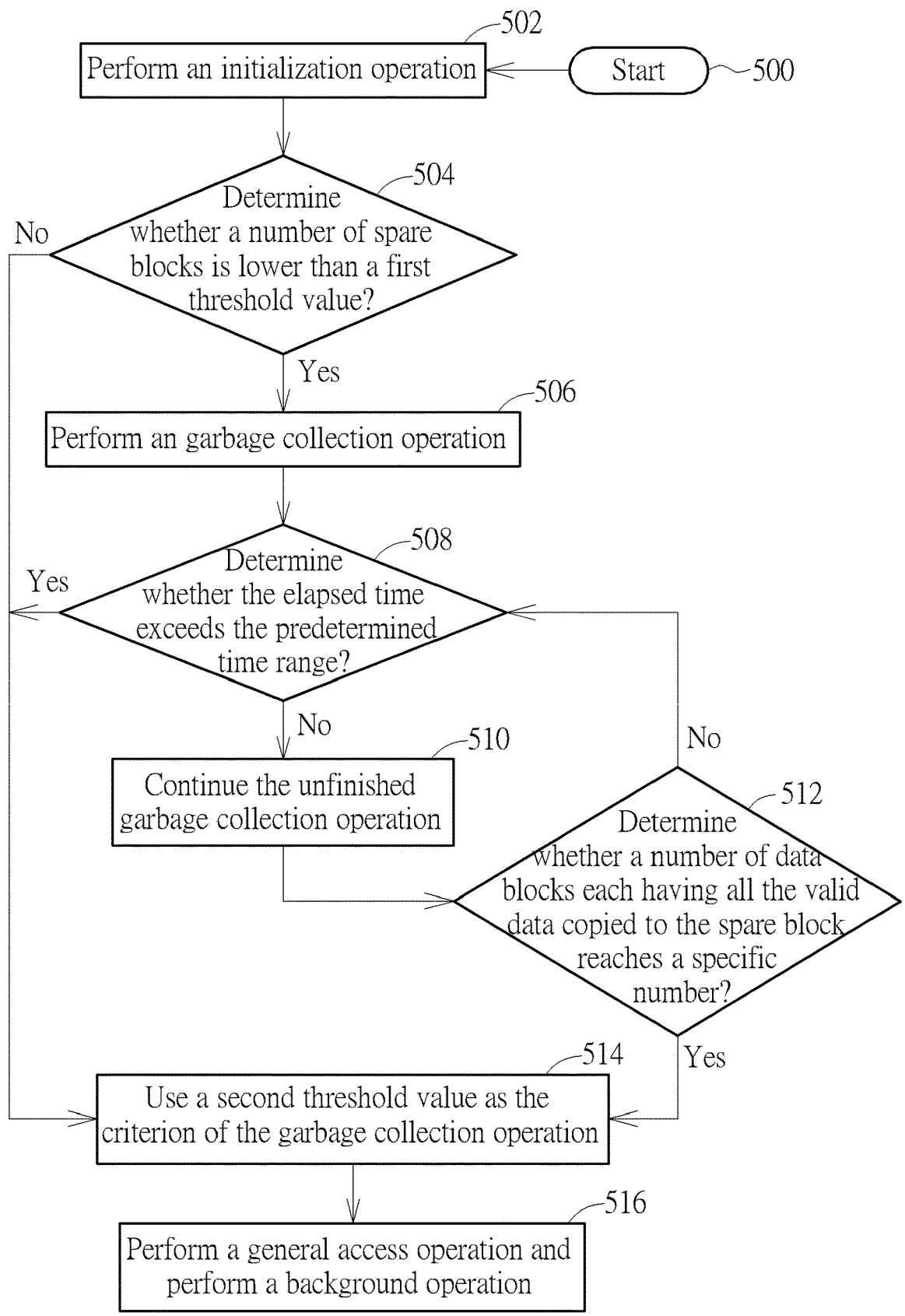
FIG. 5 is a flowchart illustrating the flash memory controller controlling the flash memory module to perform the garbage collection operation according to a second embodiment of the present invention.

FIG. 5 is a flowchart illustrating the flash memory controller 110 controlling the flash memory module 120 to perform the garbage collection operation according to a second embodiment of the present invention. In Step 500, the flow starts, and the flash memory controller 110 and the flash memory module 120 are powered on, that is, from a power-off state or a shutdown state to an active state. In Step 502, the flash memory controller 110 and the flash memory module 120 perform the initialization operation. In Step 504, the microprocessor 112 of the flash memory controller 110 determines whether a number of spare blocks in the flash memory module 120 is lower than a first threshold value. If Yes, the flow proceeds with Step 506; if No, the flow proceeds with Step 314. For example, the first threshold value may be a higher value, such as 20% or 30% of the total number of blocks of the flash memory module 120. In Step 506, the microprocessor 112 controls the flash memory module 120 to start to perform the garbage collection operation. In detail, the microprocessor 112 may refer to some internal criterions to choose block(s) to which the garbage collection operation can be applied, and move the valid data in the chosen block(s) to a spare block in sequence. Taking FIG. 4 as an example, the microprocessor 112 may move the content of the valid pages in the data block 410_1, 420_2 and 420_3 to the spare block 420_1 in sequence. During a period in which the garbage collection operation is running, in Step 508, the microprocessor 112 continually determines whether the elapsed time since the flash memory controller 110 is powered on exceeds the predetermined time range such as 1 second or 2 seconds. If the elapsed time exceeds the predetermined time range, the flow proceeds with Step 514; if the elapsed time does not exceed the predetermined time range, the flow proceeds with Step 510 to continue the unfinished garbage collection operation.

It should be noted that the principles of Steps 500 to 510 above are similar to that of Steps 300 to 310 in FIG. 3, so the detail description is omitted here for simplicity.

In Step 512, the microprocessor 112 determines whether the number of data blocks each having all the valid data copied to the spare block reaches a specific number. If Yes, the flow proceeds with Step 514; if No, the flow proceeds with Step 508. In detail, the specific number may be "2". That is to say, when all of the valid data in the data blocks 410_1 and 420_2 are copied to the spare block 420_1, the microprocessor 112 ends the garbage collection operation, writes dummy data into the remaining page (s) in the spare block 420_1, starts to update a mapping table for recording mapping between related logical addresses and physical addresses, and erases data in the data blocks 410_1 and 410_2 to set these blocks as spare blocks. Therefore, due to this garbage collection operation, the spare block 420_1 is turned into a data block, and two data blocks 410_1 and 410_2 are turned into spare blocks. Therefore, the total number of spare blocks in the flash memory module 120 is increased.

In Step 514, the microprocessor 112 is configured to determine whether to change the criterion for the garbage collection operation from the first threshold value to the second threshold value, wherein the second threshold value may be any value lower than the first threshold value. For example, the second threshold value may be 10% of the total number of blocks in the flash memory module 120.

In Step 516, the microprocessor 112 performs a background operation, wherein the background operation is configured to start to perform the garbage collection operation when the flash memory controller 110 and the flash memory module 120 are both in an idle state. For example, if another write/read command is not received within a period of time (e.g. 10 milliseconds or 100 milliseconds) after a write/read command is received from the host device 130, the unfinished garbage collection operation may be resumed, or a new garbage collection operation may be started. For example, assuming that the garbage collection operation started in Step 506 is temporarily stopped because it exceeds the predetermined time range in Step 508, the microprocessor 112 can take advantage of the flash memory controller 110 in the idle state to sequentially move the valid data from the data blocks 410_1-410_3 to the spare block 420_1, and does not end the garbage collection operation until all the pages of the spare block 420_1 are full. In another embodiment, the microprocessor 112 can take advantage of the flash memory controller 110 in the idle state to sequentially move the valid data from the data blocks 410_1 and 410_2 to the spare block 420_1, and does not end the garbage collection operation until all the valid data of the data block 410_2 are copied to the spare block 420_1, and writes dummy data into remaining page(s) in the spare block 420_1 and starts to update the mapping table for recording mapping between related logical addresses and physical addresses, and erases data in the data blocks 410_1 and 410_2 to set these blocks as spare blocks. In addition, after the garbage collection operation of the spare block 420_1 is finished and the spare block 420_1 is set as a data block, the microprocessor 112 may start to perform the garbage collection operation only when the number of the spare blocks in the flash memory module 120 is lower than the second threshold value, to prevent the normal access of the flash memory controller 110 from being affected by the frequent garbage collection operations.

As description of the embodiment in FIG. 5, because of using a higher first threshold value in the predetermined time range of the initialization operation as the criterion of the garbage collection operation, the remaining time of the predetermined time range can be fully utilized to generate some extra spare blocks, to avoid the problem of insufficient spare blocks. In one embodiment, the garbage collection operation performed during the remaining time of the above-mentioned predetermined time range is stopped when an additional spare block is generated, that is, all the valid data of the two data blocks 410_1 and 410_2 are transferred and the data blocks are turned into spare blocks. Therefore, the garbage collection operation can be prevented from excessively affecting the subsequent normal access of the flash memory controller 110, and the probability that the garbage collection operation cannot be finished due to abnormal power failure can also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, wherein the flash memory controller is configured to access a flash memory module, the flash memory controller comprising:
   a read-only memory, configured to store a code; and
   a microprocessor, configured to execute the code for controlling access of the flash memory module;
   wherein when the flash memory controller is powered on and performs an initialization operation, within a predetermined time range of the initialization operation, the microprocessor determines whether a number of spare blocks in the flash memory module is lower than a first threshold value to determine whether to perform a garbage collection operation; and when an elapsed time since the flash memory controller is powered on exceeds the predetermined time range, the microprocessor determines whether the number of spare blocks in the flash memory module is lower than a second threshold value to determine whether to perform another garbage collection operation, where the second threshold is lower than the first threshold.

2. The flash memory controller of claim 1, wherein when the flash memory controller is powered on and performs the initialization operation, if the number of spare blocks in the flash memory module is not lower than the first threshold value, the microprocessor does not perform any garbage collection operation upon the flash memory module in the predetermined time range; and if the number of spare blocks in the flash memory module is lower than the first threshold value, the microprocessor performs the garbage collection operation upon the flash memory module.

3. The flash memory controller of claim 1, wherein when the elapsed time since the flash memory controller is powered on exceeds the predetermined time range and the garbage collection operation is not finished, the microprocessor performs a background operation that starts to resume the garbage collection operation when the flash memory controller is in an idle state, until the garbage collection operation is finished; and after the garbage collection operation is finished, if the number of spare blocks in the flash memory module is not lower than the second threshold value, the microprocessor does not perform said another garbage collection operation upon the flash memory module, and if the number of spare blocks in the flash memory module is lower than the second threshold value, the microprocessor performs said another garbage collection operation upon the flash memory module.

4. The flash memory controller of claim 3, wherein when the elapsed time since the flash memory controller is powered on exceeds the predetermined time range and the garbage collection operation is not finished, the microprocessor performs the background operation that starts to resume the garbage collection operation when the flash memory controller is in the idle state, and does not end the garbage collection operation until all pages of a spare block used to store valid data of data blocks are full.

5. The flash memory controller of claim 3, wherein when the elapsed time since the flash memory controller is powered on exceeds the predetermined time range and the garbage collection operation is not finished, the microprocessor performs the background operation that starts to resume the garbage collection operation when the flash memory controller is in the idle state, and does not end the garbage collection operation until a number of data blocks each having valid data copied to a spare block reaches a specific number.

6. The flash memory controller of claim 5, wherein the specific number is two.

7. The flash memory controller of claim 5, wherein after all valid data of the data blocks whose number is equal to the specific number are copied to the spare block, if there is at least one remaining page in the spare block, the microprocessor writes dummy data into said at least one remaining page.

8. An electronic device, comprising:
   a flash memory module; and
   a flash memory controller, configured to access the flash memory module;
   wherein when the flash memory controller is powered on and performs an initialization operation, within a predetermined time range of the initialization operation, the flash memory controller determines whether a number of spare blocks in the flash memory module is lower than a first threshold value to determine whether to perform a garbage collection operation; and when an elapsed time since the flash memory controller is powered on exceeds the predetermined time range, the flash memory controller determines whether the number of spare blocks in the flash memory module is lower than a second threshold value to determine whether to perform another garbage collection operation, where the second threshold is lower than the first threshold.

9. The electronic device of claim 8, wherein when the flash memory controller is powered on and performs the initialization operation, if the number of spare blocks in the flash memory module is not lower than the first threshold value, the flash memory controller does not perform any garbage collection operation upon the flash memory module in the predetermined time range; and if the number of spare blocks in the flash memory module is lower than the first threshold value, the flash memory controller performs the garbage collection operation upon the flash memory module.

10. The electronic device of claim 8, wherein when the elapsed time since the flash memory controller is powered on exceeds the predetermined time range and the garbage collection operation is not finished, the flash memory controller performs a background operation that starts to resume the garbage collection operation when the flash memory controller is in an idle state, until the garbage collection operation is finished; and after the garbage collection operation is finished, if the number of spare blocks in the flash memory module is not lower than the second threshold value, the flash memory controller does not perform said another garbage collection operation upon the flash memory module, and if the number of spare blocks in the flash memory module is lower than the second threshold value, the flash memory controller performs said another garbage collection operation upon the flash memory module.

11. The electronic device of claim 10, wherein when the elapsed time since the flash memory controller is powered on exceeds the predetermined time range and the garbage collection operation is not finished, the flash memory controller performs the background operation that starts to resume the garbage collection operation when the flash memory controller is in the idle state, and does not end the garbage collection operation until all pages of a spare block used to store valid data of data blocks are full.

12. The electronic device of claim 10, wherein when the elapsed time since the flash memory controller is powered on exceeds the predetermined time range and the garbage collection operation is not finished, the flash memory controller performs the background operation that starts to resume the garbage collection operation when the flash memory controller is in the idle state, and does not end the garbage collection operation until a number of data blocks each having valid data copied to a spare block reaches a specific number.

13. The electronic device of claim 12, wherein the specific number is two.

14. The electronic device of claim 12, wherein after all valid data of the data blocks whose number is equal to the specific number are copied to the spare block, if there is at least one remaining page in the spare block, the flash memory controller writes dummy data into said at least one remaining page.

15. A method for performing a garbage collection operation upon a flash memory module, comprising:
  determining a flash memory controller configured to access the flash memory module is powered on and performs an initialization operation, within a predetermined time range of the initialization operation, determining whether a number of spare blocks in the flash memory module is lower than a first threshold value to determine whether to perform a garbage collection operation; and
  determining an elapsed time since the flash memory controller is powered on exceeds the predetermined time range, determining whether the number of spare blocks in the flash memory module is lower than a second threshold value to determine whether to perform another garbage collection operation, where the second threshold is lower than the first threshold.

16. The method of claim 15, wherein determining whether the number of spare blocks in the flash memory module is lower than the first threshold value to determine whether to perform the garbage collection operation comprises:
  when the flash memory controller is powered on and performs the initialization operation, if the number of spare blocks in the flash memory module is not lower than the first threshold value, not performing any garbage collection operation upon the flash memory module in the predetermined time range; and
  if the number of spare blocks in the flash memory module is lower than the first threshold value, performing the garbage collection operation upon the flash memory module.

17. The method of claim 15, further comprising:
  when the elapsed time since the flash memory controller is powered on exceeds the predetermined time range and the garbage collection operation is not finished, performing a background operation that starts to resume the garbage collection operation when the flash memory controller is in an idle state, until the garbage collection operation is finished; and
  after the garbage collection operation is finished, if the number of spare blocks in the flash memory module is not lower than the second threshold value, not performing said another garbage collection operation upon the flash memory module, and if the number of spare blocks in the flash memory module is lower than the second threshold value, performing said another garbage collection operation upon the flash memory module.

18. The method of claim 17, wherein performing the background operation that starts to resume the garbage collection operation when the flash memory controller is in the idle state comprises:
  performing the background operation that starts to resume the garbage collection operation when the flash memory controller is in the idle state, and not ends the garbage collection operation until all pages of a spare block used to store valid data of data blocks are full.

19. The method of claim 17, wherein performing the background operation that starts to resume the garbage collection operation when the flash memory controller is in the idle state comprises:
  performing the background operation that starts to resume the garbage collection operation when the flash memory controller is in the idle state, and not ends the garbage collection operation until a number of data blocks each having valid data copied to a spare block reaches a specific number.

20. The method of claim 19, wherein the specific number is two.

* * * * *